Sept. 16, 1958  D. B. McILVIN  2,851,689
FASTENER INSERTING DEVICES
Original Filed May 3, 1954  2 Sheets-Sheet 1
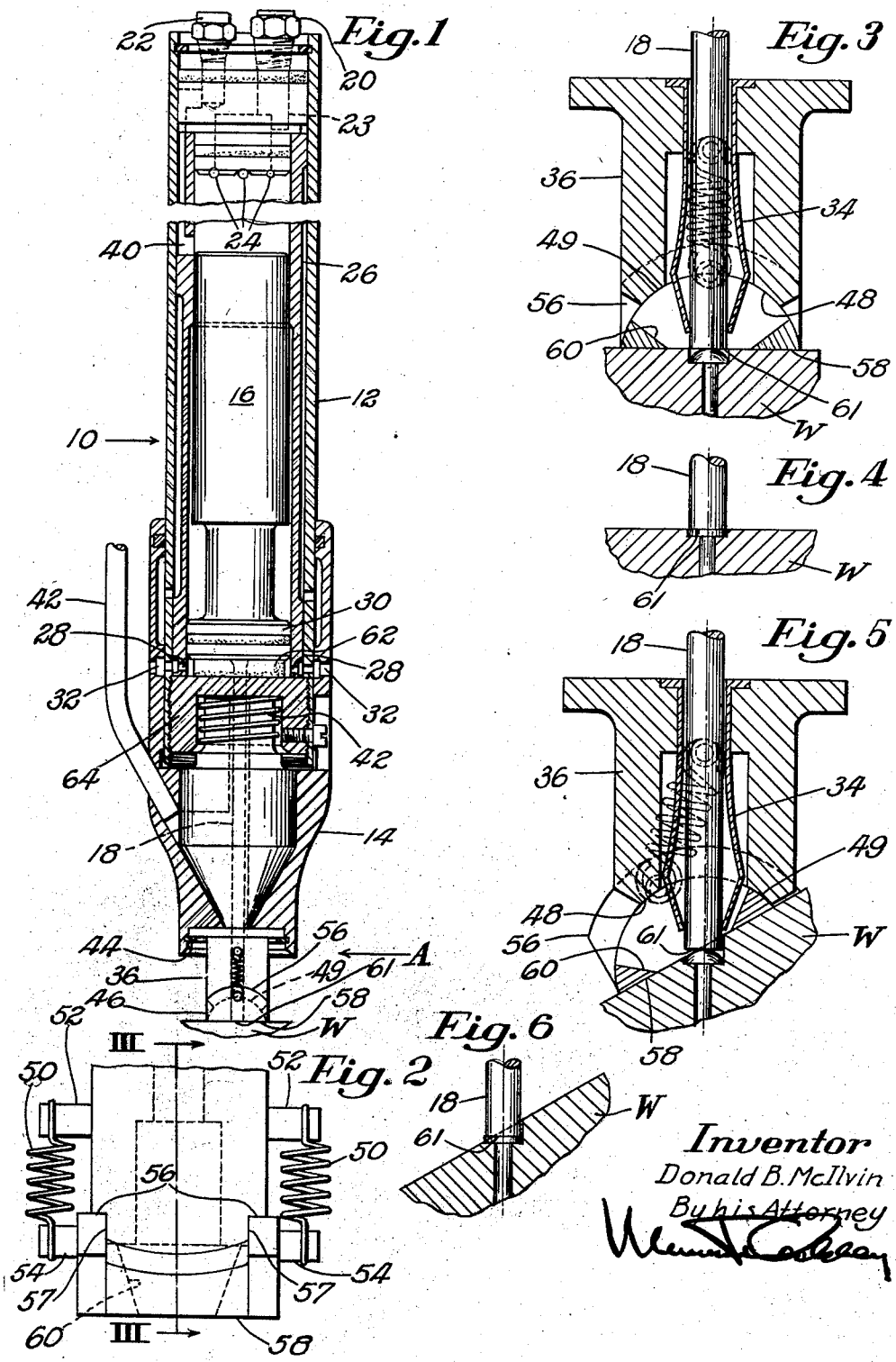
Inventor
Donald B. McIlvin
By his Attorney Sept. 16, 1958 D. B. McILVIN 2,851,689
FASTENER INSERTING DEVICES
Original Filed May 3, 1954 2 Sheets-Sheet 2

Inventor
Donald B. McIlvin
By his Attorney

United States Patent Office 2,851,689
Patented Sept. 16, 1958

2,851,689

FASTENER INSERTING DEVICES

Donald B. McIlvin, Danvers, Mass., assignor to United Shoe Machinery Corporation, Flemington, N. J., a corporation of New Jersey Original application May 3, 1954, Serial No. 427,022. Divided and this application March 28, 1956, Serial No. 574,409

8 Claims. (Cl. 1—44.4)

This invention relates to fastener inserting devices and more particularly to a hand-held automatic tool for driving headed fasteners, the tool being of the type disclosed in United States Letters Patent No. 2,820,966, granted January 28, 1958, and in my copending application Serial No. 427,022, filed May 3, 1954, of which this application is a division.

Automatic inserting tools of this type comprise a work-engaging member, a force delivering driver and means for adjusting the stroke of the driver with respect to the work-engaging member so that fasteners are driven to a predetermined depth with respect to the work piece. Such prior tools are entirely satisfactory where the fastener is at all times driven straight into the work piece, i. e., normal to its surface. However, it is impossible to drive fasteners at an acute angle with the surface of the work without having a portion of the fastener project above the surface in an undesirable manner once the driver has been adjusted for inserting fasteners normal to and flush with said surface. Furthermore, if the driver is adjusted properly to insert fasteners at a given acute angle with the surface it cannot be employed to drive at another acute angle without substantial trial and error adjustment. Therefore, the prior tools cannot be used interchangeably to drive fasteners flush with the surface at all angles including 90° without making time consuming adjustments each time the driving angle is changed.

It is an object of this invention to provide an automatic fastener inserting device which will drive fasteners substantially flush with the surface of a work piece and without adjustment regardless of the driving angle.

It is a further object of the invention to provide means for controlling the depth of penetration of a driver into a work piece automatically in accordance with the driving angle.

To attain these objects and in accordance with the various features of the present invention there is provided an inserting gun identical in all respects, with the exception of modification of its work-engaging nosepiece extension, to the inserting gun disclosed in my above-mentioned Patent No. 2,820,966. Attached to the lower end of the nosepiece extension is a compensating work-engaging member which permits insertion of fasteners at various driving angles with the head of the fastener at all times being driven substantially flush with the surface of the work piece. The compensating member, in effect, is an arcuate segment which is pivotally mounted on a corresponding concave surface on the nosepiece. The center of the arcuate surface defining said segment is substantially below the surface of the work piece which the segment engages. Centering springs are provided to hold the flat surface of the segment yieldably in a plane normal to the path of movement of the driver. By means of this mechanism, as the gun is pivoted on the compensating member to the desired driving angle, a portion of the fastener engaging edge of the driver will penetrate the work piece driving a fastener therein with its upper surface substantially flush with the surface of the work piece regardless of the angle at which it is driven.

The above and other features of the invention including various novel details of construction and combination of parts will now be more particularly described with reference to the accompanying drawings and pointed out in the claims.

In the drawings,

Fig. 1 is a vertical section through an inserting gun having a compensating nosepiece;

Fig. 2 is a view looking in the direction of the arrow A in Fig. 1 and on an enlarged scale;

Fig. 3 is a section on the line III—III in Fig. 2 illustrating the relationship of the inserting gun driver to a round headed fastener driven normal to the surface of a work piece;

Fig. 4 is a fragmentary view similar to Fig. 3 showing the relationship of the inserting gun driver to a flat headed fastener driven normal to the surface of a work piece;

Fig. 5 is a view similar to Fig. 3 but with the parts arranged to drive a fastener at an acute angle with the surface of a work piece;

Fig. 6 is a view similar to Fig. 4 showing the relationship of the driver to a flat headed fastener driven at an acute angle to the surface of a work piece;

Figure 7:
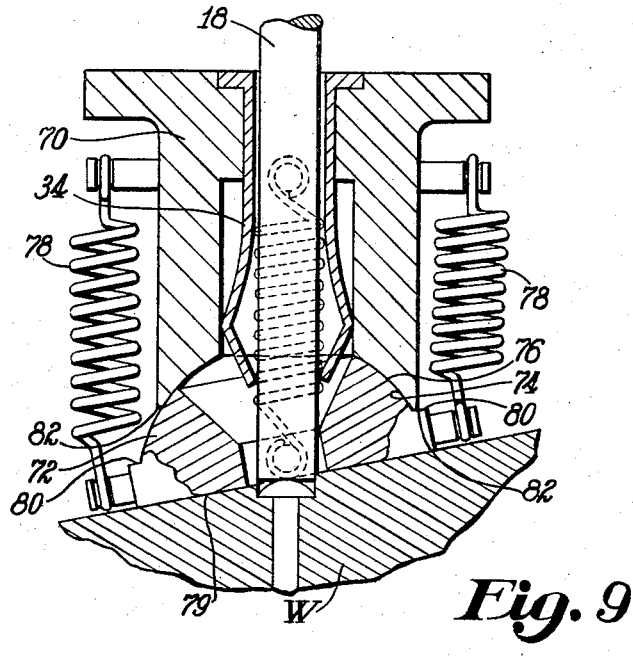
Fig. 7 is a view similar to Fig. 5 showing an alternative form of compensating nosepiece.

While the compensating member may be used in conjunction with any fastener inserting tool having a driver and a fastener retaining nosepiece, such as an automatic or semi-automatic nail or tack driver, it is herein illustrated as attached to an inserting gun 10 which is identical to the inserting gun disclosed in my above-mentioned Patent No. 2,820,966 and therefore is herein described only briefly. The gun 10 is provided with a casing 12 which may be gripped by an operator and a nosepiece 14 which is movable relative to the casing upon engagement with a work piece W to actuate the gun. The gun includes a two diameter piston 16, the lower portion of which has the larger diameter and a driver 18 extending from the lower end of the piston. Two fluid pressure lines 20 and 22 extend from the upper end of the gun. The line 20 is at all times connected to a source of pressurized fluid, preferably air, and the line 22 is connected to valve controls, not shown, for actuating a fastener feeding mechanism also not shown. Pressurized air passes from the line 20 through a plurality of passageways 23, 24, 26 and 28 to both ends of the piston 16. Since the lower end 30 of the piston has a larger diameter than the upper end the piston will normally be maintained by the fluid pressure in an upper or inactive position at the end of the gun remote from the nosepiece. The gun is actuated by pressing the nose piece 14 against the work piece W whereupon relative movement takes place between said nosepiece and the casing 12, permitting the air on the lower side of the piston to be vented through the passageways 28 and passageways 32 which, upon said relative movement, have become alined with the passageways 28. This permits the pressurized air acting on the upper side of the piston to force the piston and driver downwardly in a percussive manner to the position shown in Fig. 1, the driver striking a fastener such as a nail located within positioning means shown as a quill 34 (Figs. 3 and 5) within a nosepiece extension 36. The movement of the piston 16 to the Fig. 1 position uncovers a passageway 40 which communicates with the line 22, thus pressurizing said line to actuate the above-mentioned fastener delivery mechanism which blows a fastener through a delivery tube 42 to the quill 34 after each driving operation of the inserting gun 10. Disengagement of the nosepiece from the work piece permits a compression spring 42 to return the nose piece to its original position whereupon the piston is returned to its upper or inactive position ready to drive another fastener.

The nosepiece extension 36 is in the form of a cylindrical nozzle attached to the lower end of the nosepiece 14 by a snap ring 44. For the purposes of this application, the casing 12, the nosepiece 14 and the extension 36 may be considered the main body of the gun. The work-engaging or compensating member is in the form of a cylindrical segment 46 for reasons that will appear hereinafter. The lower end of the extension 36 is provided with a seat 48 formed on the same radius as the cylindrical surface 49 of the member 46, said member being held in engagement with the seat by two springs 50 which extend between pins 52, 54 fixed to the extension 36 and the compensating member 46, respectively. The member 46 is provided with flanges 56 engageable with flats 57 formed on the side of the extension 36 to prevent sidewise displacement of the member 46 with respect to the extension 36. The springs 50 also act as centering springs to maintain the bottom or work-engaging surface 58 of the member 46 in a plane normal to the direction of movement of the driver 18. The member 46 is also provided with a passageway 60 through which the driver 18 moves to drive nails positioned in the quill 34.

In order to accomplish the desired results the center about which the cylindrical surface 49 of the compensating member 46 is formed is located on the center line of the driver a substantial distance outside the member 46 or below its work-engaging surface 58 or the surface of a work piece W as seen in the drawings. The path of movement of the fastener-engaging end 61 of the driver 18 terminates at the same point relative to the nosepiece 14 and extension 36 each time the gun is fired, the motion of the driver being limited by the engagement of a shock absorbing pad 62 on the bottom of the piston 16 with a cap 64 threaded in the lower end of the casing 12. In normal operation the length of the driver is initially adjusted so that heads of fasteners are driven flush with the surface of the work piece W when they are driven in a plane normal to said surface, as seen in Figs. 3 and 4. The compensating member 46 enables fasteners to be driven into work pieces on an angle with their uppermost surfaces flush or substantially flush with the surface of the work piece as seen in Figs. 5 and 6. Due to the fact that the center about which the cylindrical surface 49 of the member 36 is formed is outside the member 46 or below the surface of the work piece W when the member 46 is in engagement therewith, the plane defined by the fastener engaging end 61 of the driver intersects the plane defined by the surface of the work piece along a line which is offset from the center line of the driver whereby more than half of the fastener-engaging end 61 passes below the surface of the work piece and less than half remains above, as seen best in Fig. 6, the exact ratio being determined automatically by the driving angle. Thus, a substantial portion of the heads of nails, either round (Fig. 5) or flat (Fig. 6), are always driven below the surface of a work piece in such a manner that their top portions are either flush or substantially flush with said surface regardless of whether the nails are driven normal to or at an acute angle with said surface.

While the compensating member 46 is herein disclosed as a cylindrical segment, it is also possible to form it in substantially the same manner but as a spherical segment. When formed as a spherical segment, the compensating member would provide a further advantage of being wholly universal. That is, nails could be driven on any angle (within its intended limits) in any plane. However, the cylindrical segment herein disclosed has been found to provide sufficient versatility and is felt to be preferable in view of its cheaper cost of manufacture.

Figure 8:
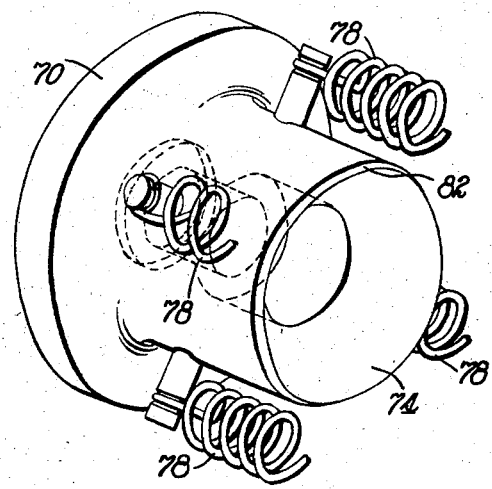
Figs. 8 and 9 are perspective views of parts of the compensating nosepiece shown in Fig. 7.
Figure 9:
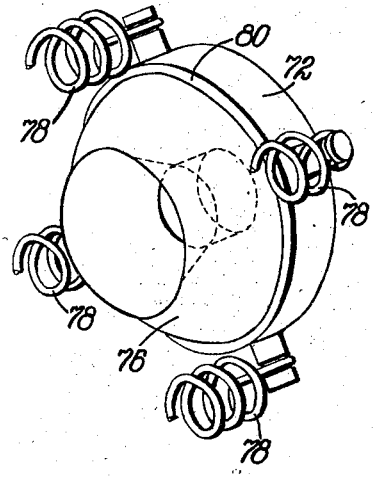

A compensating member employing a spherically shaped segment is shown in Figs. 7 to 9 and comprises a nose piece extension 70 in the form of a cylindrical nozzle similar to the extension 36 and a spherical segment 72 which is the equivalent of the cylindrical segment 46. The lower end of the extension 70 is provided with a spherical seat 74 formed on the same radius as the spherical surface 76 of the segment 72. The segment 72 is held in engagement with the seat 74 by four equally spaced springs 78 which permit universal pivoting and return the segment to its initial position with its work-engaging surface 79 normal to the axis of the driver 18 after release from the work. However, three equally spaced springs could be used as well as four to return the segment 74 to its initial position regardless of the direction in which the segment was pivoted. An annular shoulder 80 on the segment 72 engages a corresponding annular shoulder 82 on the extension 70 when the segment and the extension are pivoted to their fullest extent relatively to each other. The spherically formed compensating member operates in a manner identical with the cylindrically formed compensating member to control the depth of penetration of the driver 18 into the work.

Having thus described my invention, what I claim as new and desire to secure by Letters Patent of the United States is:

1. A fastener inserting device having, in combination, a body, a driver movable with respect to the body, and means for controlling the depth of penetration of the driver into a work piece automatically in accordance with the driving angle.

2. A fastener inserting device having, in combination, a body, a movable driver, stop means for limiting the movement of said driver at a predetermined position with respect to the body, and means for automatically controlling the depth of penetration of the driver into a work piece in accordance with the driving angle.

3. A fastener inserting device having, in combination, a body, a driver movable to a predetermined position with respect to the body, and means movable relatively to the body along an arcuate path intersecting the path of movement of said driver for controlling the depth of penetration of the driver into a work piece automatically in accordance with the driving angle.

4. A fastener inserting device having, in combination, a body, a driver movable to a predetermined position with respect to the body, and a work-engaging member for controlling the depth of penetration of the driver into a work piece automatically in accordance with the driving angle, said member having an arcuate face in sliding engagement with the body, said face being formed about a center which is outside said work-engaging member and below the surface of a work piece when said member is in engagement therewith.

5. A fastener inserting device having, in combination, a body, a driver movable to a predetermined position with respect to the body, and a work-engaging member for controlling the depth of penetration of the driver into a work piece automatically in accordance with the driving angle, said member having a cylindrical face in sliding engagement with the body, said face being formed about a center which is outside said work-engaging member and below the surface of a work piece when said member is in engagement therewith.

6. A fastener inserting device having, in combination, a body, a driver movable to a predetermined position with respect to the body, a work-engaging member for controlling the depth of penetration of the driver into a work piece automatically in accordance with the driving angle, said member having a work-engaging surface and a cylindrical face in sliding engagement with the body, said face being formed about a center which is outside said work-engaging surface and below the surface of a work piece when said member is in engagement therewith, and means for yieldably maintaining said work-engaging surface in a plane normal to the path of movement of the driver.

7. A fastener inserting device having, in combination, a body, a driver movable to a predetermined position with respect to the body, and a work-engaging member for controlling the depth of penetration of the driver into a work piece automatically in accordance with the driving angle, said member having a spherical face in sliding engagement with the body, said face being formed about a center which is outside said work-engaging member and below the surface of a work piece when said member is in engagement therewith.

8. A fastener inserting device having, in combination, a body, a driver movable to a predetermined position with respect to the body, a work-engaging member for controlling the depth of penetration of the driver into a work piece automatically in accordance with the driving angle, said member having a work-engaging surface and a spherical face in sliding engagement with the body, said face being formed about a center which is outside said work-engaging surface and below the surface of a work piece when said member is in engagement therewith, and means for yieldably maintaining said work-engaging surface in a plane normal to the path of movement of the driver.

References Cited in the file of this patent

FOREIGN PATENTS 386,485    Great Britain ---------- Jan. 19, 1933